(12) United States Patent
Jang

(10) Patent No.: US 7,377,872 B2
(45) Date of Patent: May 27, 2008

(54) SEVEN-SPEED POWERTRAIN OF AN AUTOMATIC TRANSMISSION FOR VEHICLES

(75) Inventor: Wook Jin Jang, Yongin (KR)

(73) Assignee: Hyundai Motor Company, Seoul (KR)

( * ) Notice: Subject to any disclaimer, the term of this patent is extended or adjusted under 35 U.S.C. 154(b) by 199 days.

(21) Appl. No.: 11/305,726

(22) Filed: Dec. 15, 2005

(65) Prior Publication Data

US 2007/0129205 A1 Jun. 7, 2007

(30) Foreign Application Priority Data

Dec. 6, 2005 (KR) ...................... 10-2005-0118355

(51) Int. Cl.
*F16H 3/62* (2006.01)
(52) U.S. Cl. ..................................... 475/275
(58) Field of Classification Search ................ 475/275, 475/280, 288
See application file for complete search history.

(56) References Cited

U.S. PATENT DOCUMENTS 7,204,780 B2 * 4/2007 Klemen ....................... 475/279
2007/0129206 A1 * 6/2007 Jang ........................... 475/275

FOREIGN PATENT DOCUMENTS

| DE | 199 10 299 C1 | 4/2001 |
| DE | 101 62 881 A1 | 7/2003 |
| DE | 10 2004 001 376 A1 | 8/2005 |
| JP | 2002-266956 | 9/2002 |
| JP | 2005-083479 | 3/2005 |

* cited by examiner

*Primary Examiner*—Dirk Wright
(74) *Attorney, Agent, or Firm*—Morgan Lewis & Bockius LLP

(57) ABSTRACT

Seven forward speeds and three reverse speeds are realized by combining two compound planetary gear sets using three clutches and four brakes, and each shift speed is realized by operating two frictional elements, thereby reducing a capacity of a hydraulic pump and enhancing an efficiency of a hydraulic pressure control by realizing each shift speed by operating two frictional elements. A first shift portion and a second shift portion are disposed on the same shaft axis. The first shift portion includes a first planetary gear set formed as a double pinion planetary gear set and a second planetary gear set formed as a single pinion planetary gear set, and the second shift portion includes a third planetary gear set formed as a single pinion planetary gear set and a fourth planetary gear set formed as a single pinion planetary gear set. The first shift portion is combined by one clutch and two brakes, and the second shift portion is combined by one clutch and two brakes.

12 Claims, 5 Drawing Sheets

FIG.2

|     | C1 | C2 | B1 | B2 | B3 | B4 |
|-----|----|----|----|----|----|----|
| 1st |    |    | ○  |    | ○  |    |
| 2nd |    |    |    | ○  | ○  |    |
| 3rd |    | ○  |    |    | ○  |    |
| 4th | ○  |    |    |    | ○  |    |
| 5th | ○  | ○  |    |    |    |    |
| 6th | ○  |    |    | ○  |    |    |
| 7th | ○  |    | ○  |    |    |    |
| R1  |    |    | ○  |    |    | ○  |
| R2  |    |    |    | ○  |    | ○  |
| R3  |    | ○  |    |    |    | ○  |

FIG.5

|    | K1 | K2 | K3 | B1 | B2 | B3 | B4 |
|----|----|----|----|----|----|----|----|
| 1  |    |    | ○  |    | ○  | ○  |    |
| 2  |    |    | ○  | ○  | ○  |    |    |
| 3  | ○  |    | ○  |    | ○  |    |    |
| 4  | ○  | ○  |    |    | ○  |    |    |
| 5  | ○  | ○  | ○  |    |    |    |    |
| 6  |    | ○  | ○  | ○  |    |    |    |
| 7  |    | ○  | ○  |    |    | ○  |    |
| R1 |    |    | ○  | ○  |    |    | ○  |
| R2 | ○  |    | ○  |    |    |    | ○  |
| R3 |    |    | ○  |    |    | ○  | ○  |

# SEVEN-SPEED POWERTRAIN OF AN AUTOMATIC TRANSMISSION FOR VEHICLES

CROSS-REFERENCE TO RELATED APPLICATION

This application claims priority to and the benefit of Korean Patent Application No. 10-2005-0118355 filed in the Korean Intellectual Property Office on Dec. 6, 2005, the entire contents of which are incorporated herein by reference.

BACKGROUND OF THE INVENTION (a) Field of the Invention

The present invention relates to a seven-speed powertrain of an automatic transmission for vehicles.

(b) Description of the Related Art

Vehicle companies have been developed and adopted different types of a powertrain of an automatic transmission of vehicles, and most of automatic transmissions generally used in recent day are a four-speed or a five-speed automatic transmission. Recently, a six-speed automatic transmission has been developed and adopted to a vehicle, and a seven-speed automatic transmission is being developed.

As an example, as shown in FIG. 4 (BENZ 7G-TRONIC seven-speed transmission), a powertrain is formed to realize seven speeds by combining two compound planetary gear sets using three clutches, four brakes, and one one-way clutch.

In more detail, a first compound planetary gear set 100 is formed by combining a single pinion planetary gear set and a double pinion planetary gear set, and a planet carrier 102 and a sun gear 104 are shared, so that the first compound planetary gear set 100 has four operational elements of the first sun gear 104, the first planet carrier 102, a first ring gear 106, and a second ring gear 108.

In addition, a second compound planetary gear set 110 is formed by combining two single pinion planetary gear sets, and a third ring gear 112 and a fourth planet carrier 114 are directly connected to each other, so that the second compound planetary gear set 110 has five operational elements of a third sun gear 116, a fourth sun gear 118, a third planet carrier 120, a fourth planet carrier 124, and a fourth ring gear 126.

The first planet carrier 102 is fixedly connected to the fourth ring gear 126 and is connected to a transmission housing 128 via a one-way clutch F.

The first sun gear 104 is variably connected to the first ring gear 106 by a first clutch K1 and is variably fixed to the transmission housing 128 by a first brake B1.

The second ring gear 108 is directly connected to an input shaft 130 so as to always act as an input element, and the third ring gear 112 is variably connected to the input shaft 128 via a second clutch K2.

The third sun gear 116 is variably connected to the fourth sun gear 118 via a third clutch K3, and is variably connected to the transmission housing 128 via a second brake B2.

The first ring gear 106 and the fourth planet carrier 124 are respectively variably connected to the transmission housing 128 via a third brake B3 and a fourth brake B4, and the third planet carrier 120 is fixedly connected to an output shaft 132 so as to always act as an output element.

As shown in FIG. 5, in the above-described seven-speed powertrain, the third clutch K3, the second brake B2, and the third brake B3 are operated at a first forward speed; the third clutch K3, the first brake B1, and the second brake B2 are operated at a second forward speed; the first clutch K1, the third clutch K3, and the second brake B2 are operated at a third forward speed; the first clutch K1, the second clutch K2, and the second brake B2 are operated at a fourth forward speed; the first clutch K1, the second clutch K2, and the third clutch K3 are operated at a fifth forward speed; the second clutch K2, the third clutch K3, and the first brake B1 are operated at a sixth forward speed; and the first clutch K1, the third clutch K3, and the third brake B3 are operated at a seventh forward speed.

In addition, the third clutch K3, the second brake B2, and the fourth brake B4 are operated at a first reverse speed; the first clutch K1, the third clutch K3, and the fourth brake B4 are operated at a second reverse speeds; and the third clutch K3, the third brake B3, and the fourth brake B4 are operated at a third reverse speed.

However, although the above-described seven-speed power train may realize seven forward speeds and three reverse speeds, since seven frictional elements and one one-way clutch are needed, the structure becomes complicated, and an overall length increases.

In addition, since three frictional elements operate at each shift speed, an efficiency of a hydraulic pressure control is deteriorated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a seven-speed powertrain of an automatic transmission for vehicles realizing seven forward speeds and three reverse speeds by combining two compound planetary gear sets using three clutches and four brakes and having advantages of having small size and reducing a manufacturing cost.

In addition, the present invention has also been made in an effort to provide a seven-speed powertrain of an automatic transmission for vehicles having advantages of reducing a capacity of a hydraulic pump and enhancing an efficiency of a hydraulic pressure control by realizing each shift speed by operating two frictional elements.

In an exemplary seven-speed powertrain of an automatic transmission according to an embodiment of the present invention, a first shift portion and a second shift portion are disposed on the same shaft axis, the first shift portion comprising a first planetary gear set formed as a double pinion planetary gear set and a second planetary gear set formed as a single pinion planetary gear set, and the second shift portion comprising a third planetary gear set formed as a single pinion planetary gear set and a fourth planetary gear set formed as a single pinion planetary gear set. The first shift portion is combined by one clutch and two brakes, so as to realize three forward speeds with rotation power input through an input route from an input shat. The second shift portion is combined by one clutch and two brakes so as to realize seven forward speeds and three reverse speed with rotation power input through an input route from the first shift portion and a variable input route from the input shaft.

Among six operation elements of the first and second planetary gear sets, two pairs of operational elements may be fixedly connected to each other, so that the first shift portion has a first, a second, a third, and a fourth operational elements, and wherein: the first operational element selectively acts as a fixed element; the second operational element selectively acts as a fixed element and operates such that the first planetary gear set becomes in a direct coupling state; the third operational element always acts as an output element and is variably connected to the second operational element such that the first planetary gear set becomes in a direct coupling state; and the fourth operational element always acts as an input element.

In the first shift portion, the first sun gear and the second sun gear may be directly connected to each other, and the first planet carrier and the second planet carrier may be directly connected to each other, so that the first shift portion comprises a first operational element formed as the first and second sun gears, a second operational element formed as the first ring gear, a third operational element formed as the first and second planet carriers, and a fourth operational element formed as the second ring gear.

The first operational element and the second operational element may be respectively connected to a transmission housing via respective brakes, and the second operational element may be connected to the third operational element via a clutch.

Among six operation elements of the third and fourth planetary gear sets, two pairs of operational elements may be fixedly connected to each other, so that the second shift portion has a fifth, a sixth, a seventh, and an eighth operational elements, and wherein: the fifth operational element selectively acts as a fixed element; the sixth operational element selectively acts as a fixed element; the seventh operational element selectively acts an input element and selectively acts as a fixed element; and the eighth operational element acts as an input element.

In the second shift portion, the third and fourth sun gears may be fixedly connected to each other, and the third ring gear and the fourth planet carrier may be fixedly connected to each other, so that the second shift portion comprises a fifth operational element formed as the third and fourth sun gears, a sixth operational element formed as the third planet carrier, a seventh operational element formed as the third ring gear and the fourth planet carrier, and an eighth operational element formed as the fourth ring gear.

The fifth operational element and the seventh operational element may be respectively connected to a transmission housing via respective brakes, and the seventh operational element may be variably connected to an input shaft via a clutch.

In an exemplary seven-speed powertrain of an automatic transmission according to an embodiment of the present invention, a first shift portion and a second shift portion are disposed on the same shaft axis, a first shift portion and a second shift portion are disposed on the same shaft axis and are combined by two clutches and four brakes, the first shift portion comprising a first planetary gear set formed as a double pinion planetary gear set and a second planetary gear set formed as a single pinion planetary gear set, the second shift portion comprising a third planetary gear set formed as a single pinion planetary gear set and a fourth planetary gear set formed as a single pinion planetary gear set. Among six operation elements of the first and second planetary gear sets, two pairs of operational elements are fixedly connected to each other, so that the first shift portion has a first, a second, a third, and a fourth operational elements; the first operational element selectively acts as a fixed element; the second operational element selectively acts as a fixed element and operates such that the first planetary gear set becomes in a direct coupling state; the third operational element always acts as an output element and is variably connected to the second operational element such that the first planetary gear set becomes in a direct coupling state; and the fourth operational element always acts as an input element. Among six operation elements of the third and fourth planetary gear sets, two pairs of operational elements are fixedly connected to each other, so that the second shift portion has a fifth, a sixth, a seventh, and an eighth operational elements; the fifth operational element selectively acts as a fixed element; the sixth operational element selectively acts as a fixed element; the seventh operational element selectively acts an input element and selectively acts as a fixed element; and the eighth operational element acts as an input element.

In the first shift portion, the first sun gear and the second sun gear may be directly connected to each other, and the first planet carrier and the second planet carrier may be directly connected to each other, so that the first shift portion comprises a first operational element formed as the first and second sun gears, a second operational element formed as the first ring gear, a third operational element formed as the first and second planet carriers, and a fourth operational element formed as the second ring gear.

The first operational element and the second operational element may be respectively connected to a transmission housing via respective brakes, and the second operational element may be connected to the third operational element via a clutch.

In the second shift portion, the third and fourth sun gears may be fixedly connected to each other, and the third ring gear and the fourth planet carrier may be fixedly connected to each other, so that the second shift portion comprises a fifth operational element formed as the third and fourth sun gears, a sixth operational element formed as the third planet carrier, a seventh operational element formed as the third ring gear and the fourth planet carrier, and an eighth operational element formed as the fourth ring gear.

The fifth operational element and the seventh operational element may be respectively connected to a transmission housing via respective brakes, and the seventh operational element may be variably connected to an input shaft via a clutch.

BRIEF DESCRIPTION OF THE DRAWINGS

FIG. 2 is an operational chart of frictional element of a powertrain according to an exemplary embodiment of the present invention.

Figure 5:
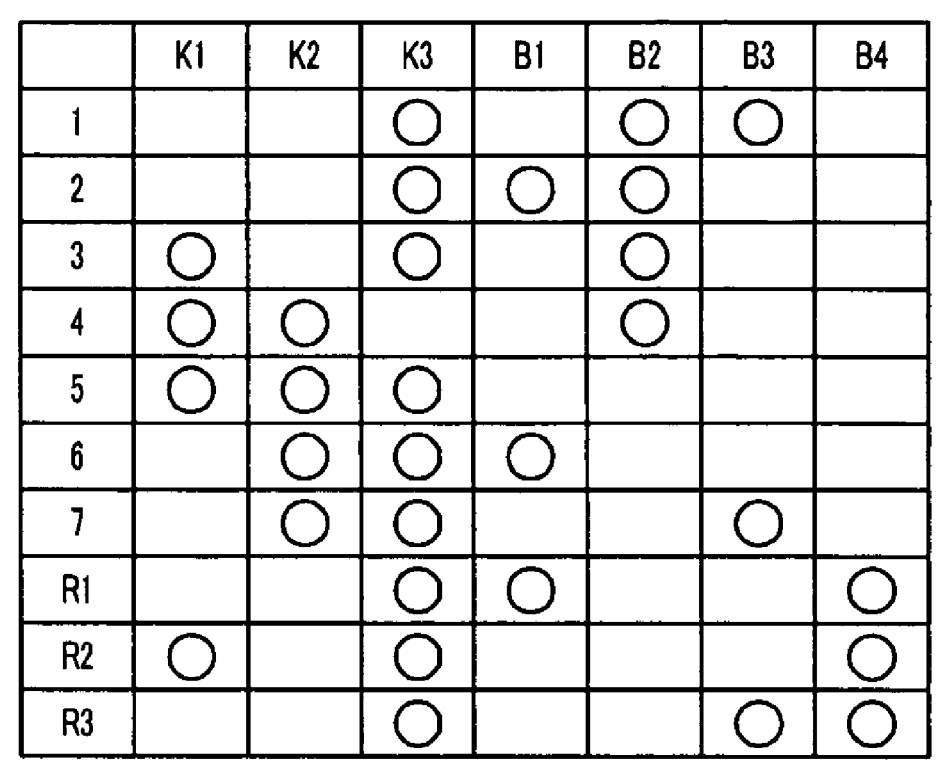

FIG. 5 is an operational chart of frictional element of the powertrain of

DETAILED DESCRIPTION OF THE EMBODIMENTS

An exemplary embodiment of the present invention will hereinafter be described in detail with reference to the accompanying drawings.

Figure 1:
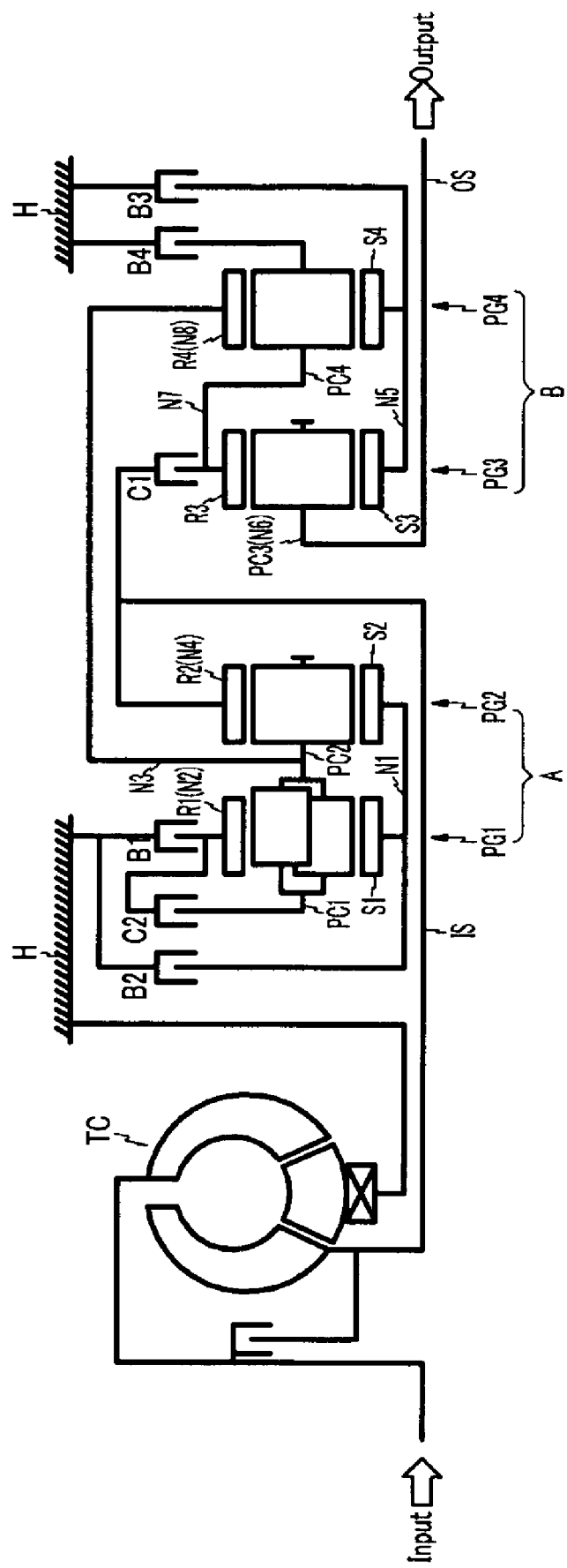
FIG. 1 is a stick diagram of a powertrain according to an exemplary embodiment of the present invention.

Referring to FIG. 1, a powertrain according to an exemplary embodiment of the present invention includes: a first shift portion A including a first planetary gear set PG1 formed as a double pinion planetary gear set and a second planetary gear set PG2 formed as a single pinion planetary gear set; a second shift portion B including a third planetary gear set PG3 formed as a single pinion planetary gear set and a fourth planetary gear set PG4 formed as a single pinion planetary gear set; and two clutches C1 and C2 and four brakes B1, B2, B3, and B4.

The first shift portion A and the second shift portion B are disposed on the same shaft axis line. A first sun gear S1 of the first planetary gear set PG1 and a second sun gear of the second planetary gear set PG2 are fixedly connected to each other, and a first planet carrier PC1 and a second planet carrier PC2 are fixedly connected to each other.

Accordingly, the first shift portion A includes a first operational element N1 formed as the first and second sun gears S1 and S2, a second operational element N2 formed as the first ring gear R1, a third operational element N3 formed as the first and second planet carriers PC1 and PC2, and a fourth operational element N4 formed as the second ring gear R2.

In addition, in the second shift portion B, a third sun gear S3 and a fourth sun gear S4 are fixedly connected to each other, and a third ring gear R3 and a fourth planet carrier PC4 are fixedly connected to each other.

Accordingly, the second shift portion B includes: a fifth operational element N5 formed as the third and fourth sun gears S3 and S4; a sixth operational element N6 formed as a third planet carrier PC3; a seventh operational element N7 formed as the third ring gear R3 and the fourth planet carrier PC4; and an eighth operational element N8 formed as the fourth ring gear R4.

The first and second shift portions A and B are combined by a first clutch C1, a second clutch C2, a first brake B1, a second brake B2, a third brake B3, and a fourth brake B4, so that the first shift portion outputs forward three speed such as a reduced speed and the same speed, and the second shift portion B outputs forward seven speeds and reverse three speeds using power input from the first shift portion A and rotation power input from an input shaft IS.

For such operations, the first operational element N1 is variably connected to a transmission housing H via the second brake B2 interposed therebetween so as to act as a selective fixed element.

The second operational element N2 is variably connected to the third operational element N3 via the second clutch C2 interposed therebetween, and the second operational element N3 is connected to the transmission housing H via the first brake B1 interposed therebetween so as to selectively act as a fixed element.

The third operational element N3 is fixedly connected to the eighth operational element N8 so as to act as an output element of the first shift portion A and is connected to the transmission housing H via the first brake B1 interposed therebetween so as to selectively acts as a fixed element.

The fourth operational element N4 is directly connected to the input shaft IS receiving rotation power from a torque converter TC so as to always act as an input element.

The fifth operational element N5 is connected to the transmission housing H via the third brake B3 interposed therebetween so as to act as a selective fixed element.

The sixth operational element N6 is connected to an output shaft OS so as to always act as an output element.

The seventh operational element N7 is connected to the input shaft IS via the first clutch C1 interposed therebetween so as to act as a selective input element and is connected to the transmission housing H via the fourth brake B4 interposed therebetween so as to act as a selective fixed element.

The eighth operational element N8 is connected to the third operational element N3 so as to act as an input element always receiving power output from the first shift portion A.

The above-described powertrain according to an embodiment of the present invention can realize seven forward speeds and three reverse speeds by operating frictional elements as shown in FIG. 2.

Figure 3:
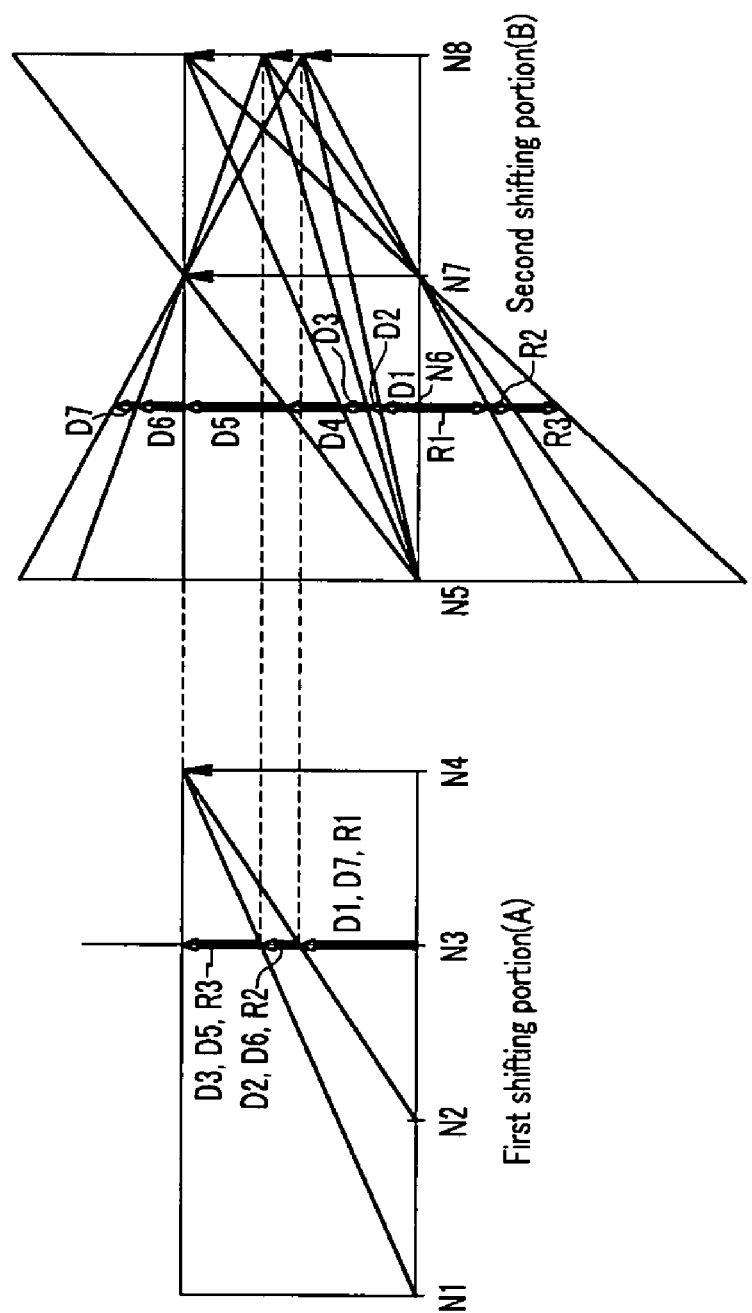
FIG. 3 is a speed diagram by a lever analysis method of a powertrain according to an exemplary embodiment of the present invention.
Figure 4:
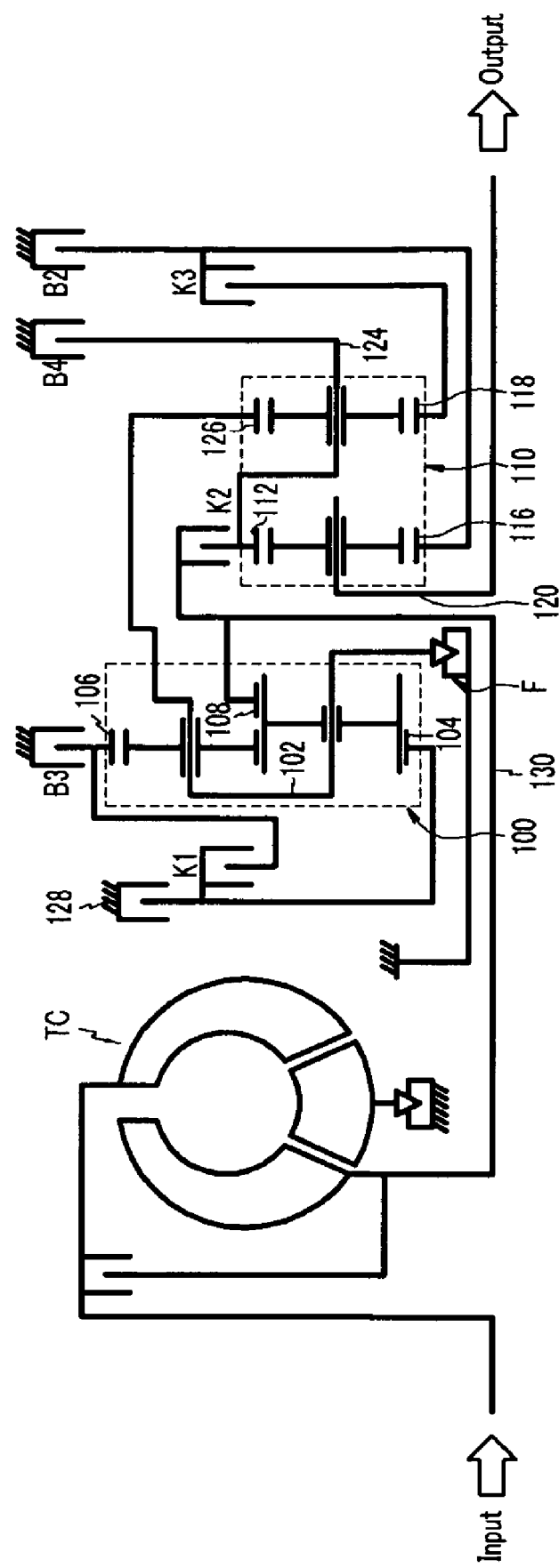
FIG. 4 is a stick diagram of a conventional seven-speed powertrain.

FIG. 3 is a speed diagram by a lever analysis method of a powertrain according to an exemplary embodiment of the present invention. Positions of the operational elements on the speed diagram are determined by connections of the planetary gear set, and this is well known in the art so further detailed explanations will be omitted.

That is, at the first forward speed, the first brake B1 of the first shift portion A and the third brake B3 of the second shift portion B are operated.

Accordingly, in the first shift portion A, the second operational element N2 acts as a fixed element by an operation of the first brake B1 and an input is performed through the fourth operational element N4, so that reduced power is output through the third operational element N3 that is an output element.

If the reduced rotation power output from the first shift portion A is input to the second shift portion B through the eighth operational element N8, the fifth operational element N5 acts as a fixed element since the third brake B3 operates and the reduced rotation power is output through the sixth operational element N6, so that the first forward speed that is the lowest shift speed is realized (referring to D1 in FIG. 3).

If a vehicle speed is increased in a control state of the first forward speed, a transmission control unit controls the operation of the first brake B1 of the first shift portion A to be released from the control state of the first forward speed and controls the second brake B2 to be operated.

Then, a fixed element of the first shift portion A is changed to the first operational element N1, so the rotation power is reduced to a speed higher than the first forward speed. The reduced power is output through the third operational element N3 and is then input to the eighth operational element N8 of the second shift portion B.

If the reduced power output from the first shift portion A is input to the second shift portion B through the eighth operational element N8, the second shift portion B reduces the input power, which is higher than the input power at the first forward speed, with the same reduction ratio as the first forward speed and outputs the reduced power since the second shift portion B is controlled in the same manner as the first forward speed, so that the second forward speed is realized (referring to D2 of FIG. 3).

If a vehicle speed is increased in a control state of the second forward speed, a transmission control unit controls the operation of the second brake B2 of the first shift portion A to be released from the control state of the second forward speed and controls the second clutch C2 of the first shift portion A to be operated.

Accordingly, since the first operational element N1 and the second operational element N2 of the first shift portion A are fixedly connected to each other by the operation of the second clutch C2 and the first planetary gear set PG1 thereby becomes a direct coupling state, the whole portion of the first shift portion A becomes a direct coupling state so that input power is output through the third operational element N3 of the first shift portion A without speed change and the power output from the first shift portion A is input to the eighth operational element N8 of the second shift portion B.

If the rotation power of the same speed with the original input is input to the second shift portion B through the eighth operational element N8, the second shift portion B reduces the input power, which is higher than the input power at the second forward speed, with the same reduction ratio as the second forward speed and outputs the reduced power since the second shift portion B is controlled in the same manner as the first and second forward speeds, so that the third forward speed is realized (referring to D3 of FIG. 3).

If a vehicle speed is increased in a control state of the third forward speed, a transmission control unit controls the operation of the second clutch C2 of the first shift portion A to be released from the control state of the third forward speed and controls the first clutch C1 of the second shift portion B to be operated.

Since no frictional element of the first shift portion A operates, the first shift portion A has no effect on speed shifting. In the second shift portion B, rotation power is input through the seventh operational element N7 by the operation of the first clutch C1, and the fifth operational element N5 acts as a fixed element the operation of the third brake B3.

Accordingly, output speed becomes higher than that of the third forward speed and thereby the fourth forward speed is realized (referring to D4 of FIG. 3).

If a vehicle speed is increased in a control state of the fourth forward speed, a transmission control unit controls the operation of the third brake B3 of the second shift portion B to be released from the control state of the fourth forward speed and controls the second clutch C2 of the first shift portion A to be operated.

Since the first planetary gear set PG1 of the first shift portion A becomes in a direct coupling state just as at the third forward speed by the operation of the second clutch C2, the whole portion of the first shift portion A becomes a direct coupling state so that input power is output through the third operational element N3 of the first shift portion A without speed change and the power output from the first shift portion A is input to the eighth operational element N8 of the second shift portion B.

In addition, since rotation power is input to the second shift portion B by the operation of the first clutch C1, rotation power input to the second shift portion B is performed through two routes. Accordingly, the whole portion of the second shift portion becomes a direct coupling state, so that the fifth forward speed in which the input is output without speed change is realized (referring to D5 of FIG. 3).

If a vehicle speed is increased in a control state of the fifth forward speed, a transmission control unit controls the operation of the second clutch C2 of the first shift portion A to be released from the control state of the fifth forward speed and controls the second brake B2 of the first shift portion A to be operated.

Since in the first shift portion A the first operational element N1 acts as a fixed element in a state that power is input through the fourth operational element N4, the rotation power is reduced at the same ratio as the second forward speed and is output through the third operational element N3. The reduced power output from the first shift portion A is input through the eighth operational element N8 of the second shift portion B.

If the reduced rotation power is input to the second shift portion B through the eighth operational element N8 from the first shift portion A, since in the second shift portion B rotation power is input through the eighth operational element N8 in a state that rotation power of the input shaft IS is input through the seventh operational element N7 by the operation of the first clutch C1, rotation power having higher speed than rotation power input through the seventh operational element N7 is output by cooperation of these input powers, so that the sixth forward speed outputting increased rotation power is realized (referring to D6 of FIG. 3).

If a vehicle speed is increased in a control state of the sixth forward speed, a transmission control unit controls the operation of the second clutch C2 of the first shift portion A to be released from the control state of the sixth forward speed and controls the first brake B1 of the first shift portion A to be operated.

Then, since in the first shift portion A the second operational element N2 acts as a fixed element in a state that rotation power is input through the fourth operational element N4, the rotation power is reduced with a reduction ratio greater than that in the sixth forward speed and the reduced power is output through the third operational element N3, and the power output from the first shift portion A is input through the eighth operational element N8 of the second shift portion B.

In the reduced rotation power is input to the second shift portion B through the eighth operational element N8 from the first shift portion A, since in the second shift portion B the rotation power reduced with a reduction ratio greater than that in the sixth forward speed is input through the eighth operational element N8 in a state that the rotation power of the input shaft IS is input through the seventh operational element N7 by the operation of the first clutch C1, rotation power having higher speed than rotation power input through the seventh operational element N7 is output by cooperation of these input powers, so that the seventh forward speed outputting increased rotation power more than the sixth forward speed is realized (referring to D7 of FIG. 3).

At the first reverse speed, the first brake B1 of the first shift portion A and the fourth brake B4 of the second shift portion B are controlled to be operated.

Then, since in the first shift portion A rotation power is input through the forth operational element N4 in a state that the second operational element N2 acts as a fixed element by the operation of the first brake B1, reduced rotation power is output through the third operational element N3 that is an output element, and rotation power is input through the eighth operational element N8 of the second shift portion B.

If the reduced rotation power is input to the second shift portion B through the eighth operational element N8 from the first shift portion A, since the fourth brake B4 in the second shift portion B operates, the seventh operational element N7 acts as a fixed element and reduced rotation power in a reverse direction is output through the sixth operational element N6, so that the first reverse speed is realized (referring to R1 of FIG. 3).

If a vehicle speed is increased in a control state of the first reverse speed, a transmission control unit controls the operation of the first brake B1 of the first shift portion A to be released from the control state of the first reverse speed and controls the second brake B2 of the first shift portion A to be operated.

Accordingly, in the first shift portion A, the fixed element is changed to the first operational element N1, and rotation power is reduced at a speed a little bit higher than the first reverse speed. The reduced output power is output through the third operational element N3, and the rotation power output from the first shift portion A is input through the eighth operational element N8 of the second shift portion B.

If the reduced rotation power is input to the second shift portion B through the eighth operational element N8 from the first shift portion A, since the second shift portion B is controlled in the same way as the first reverse speed, the rotation power with a higher speed than the first reverse speed is reduced with the same reduction ratio as the first reverse speed and the reduced power is output, so that the second reverse speed is realized (referring to R2 of FIG. 3).

If a vehicle speed is increased in a control state of the second reverse speed, a transmission control unit controls the operation of the second brake B2 of the first shift portion A to be released from the control state of the second reverse speed and controls the second clutch C2 of the first shift portion A to be operated.

Accordingly, since in the first shift portion A the first planetary gear set PG1 becomes in a direct coupling state by the operation of the second clutch C2, the whole portion of the first shift portion A becomes in a direct coupling state so that input rotation power is output through the third operational element N3 without speed change, and the power output from the first shift portion A is input through the eighth operational element N8 of the second shift portion B.

If the rotation power of the same speed as the original input is input to the second shift portion B through the eighth operational element N8 from the first shift portion A, since the second shift portion B is controlled in the same way as the first and second reverse speeds, rotation power of a higher speed than the second reverse speed is reduced with the same reduction ratio as the second reverse speed, and the reduced power is output, so that the third reverse speed is realized (referring to R3 of FIG. 3).

According to the present invention, since two compound planetary gear sets are disposed on the same shaft axis line and the compound planetary gear set thereof are combined by two clutches and four brakes so as to realize seven forward speeds and three reverse speeds, an overall size of a transmission can be substantially decreased and a manufacturing cost can also be reduced.

In addition, since each shift speed is realized by the operation of two frictional elements, a capacity of a hydraulic pump can be reduced and an efficiency of a hydraulic pressure control can be enhanced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A seven-speed powertrain of an automatic transmission for vehicles, wherein a first shift portion and a second shift portion are disposed on the same shaft axis, the first shift portion comprising a first planetary gear set formed as a double pinion planetary gear set and a second planetary gear set formed as a single pinion planetary gear set, and the second shift portion comprising a third planetary gear set formed as a single pinion planetary gear set and a fourth planetary gear set formed as a single pinion planetary gear set, and wherein:
the first shift portion is combined by one clutch and two brakes, so as to realize three forward speeds with rotation power input through an input route from an input shaft; and
the second shift portion is combined by one clutch and two brakes so as to realize seven forward speeds and three reverse speed with rotation power input through an input route from the first shift portion and a variable input route from the input shaft.

2. The seven-speed powertrain of claim 1, wherein, among six operation elements of the first and second planetary gear sets, two pairs of operational elements are fixedly connected to each other, so that the first shift portion has a first, a second, a third, and a fourth operational elements, and wherein:
the first operational element selectively acts as a fixed element;
the second operational element selectively acts as a fixed element and operates such that the first planetary gear set becomes in a direct coupling state;
the third operational element always acts as an output element and is variably connected to the second operational element such that the first planetary gear set becomes in a direct coupling state; and
the fourth operational element always acts as an input element.

3. The seven-speed powertrain of claim 1, wherein, in the first shift portion, the first sun gear and the second sun gear are directly connected to each other, and the first planet carrier and the second planet carrier are directly connected to each other, so that the first shift portion comprises a first operational element formed as the first and second sun gears, a second operational element formed as the first ring gear, a third operational element formed as the first and second planet carriers, and a fourth operational element formed as the second ring gear.

4. The seven-speed powertrain of claim 2, wherein:
the first operational element and the second operational element are respectively connected to a transmission housing via respective brakes; and
the second operational element is connected to the third operational element via a clutch.

5. The seven-speed powertrain of claim 1, wherein, among six operation elements of the third and fourth planetary gear sets, two pairs of operational elements are fixedly connected to each other, so that the second shift portion has a fifth, a sixth, a seventh, and an eighth operational elements, and wherein:
the fifth operational element selectively acts as a fixed element;
the sixth operational element selectively acts as a fixed element;
the seventh operational element selectively acts an input element and selectively acts as a fixed element; and
the eighth operational element acts as an input element.

6. The seven-speed powertrain of claim 1, wherein, in the second shift portion, the third and fourth sun gears are fixedly connected to each other, and the third ring gear and the fourth planet carrier are fixedly connected to each other, so that the second shift portion comprises a fifth operational element formed as the third and fourth sun gears, a sixth operational element formed as the third planet carrier, a seventh operational element formed as the third ring gear and the fourth planet carrier, and an eighth operational element formed as the fourth ring gear.

7. The seven-speed powertrain of claim 5, wherein:
the fifth operational element and the seventh operational element are respectively connected to a transmission housing via respective brakes; and
the seventh operational element is variably connected to an input shaft via a clutch.

8. A seven-speed powertrain of an automatic transmission for vehicles, wherein a first shift portion and a second shift portion are disposed on the same shaft axis and are combined by two clutches and four brakes, the first shift portion comprising a first planetary gear set formed as a double pinion planetary gear set and a second planetary gear set formed as a single pinion planetary gear set, the second shift portion comprising a third planetary gear set formed as a single pinion planetary gear set and a fourth planetary gear set formed as a single pinion planetary gear set, and wherein:

among six operation elements of the first and second planetary gear sets, two pairs of operational elements are fixedly connected to each other, so that the first shift portion has a first, a second, a third, and a fourth operational elements;

the first operational element selectively acts as a fixed element;

the second operational element selectively acts as a fixed element and operates such that the first planetary gear set becomes in a direct coupling state;

the third operational element always acts as an output element and is variably connected to the second operational element such that the first planetary gear set becomes in a direct coupling state; and the fourth operational element always acts as an input element, and wherein:

among six operation elements of the third and fourth planetary gear sets, two pairs of operational elements are fixedly connected to each other, so that the second shift portion has a fifth, a sixth, a seventh, and an eighth operational elements;

the fifth operational element selectively acts as a fixed element;

the sixth operational element selectively acts as a fixed element;

the seventh operational element selectively acts an input element and selectively acts as a fixed element; and the eighth operational element acts as an input element.

9. The seven-speed powertrain of claim 8, wherein, in the first shift portion, the first sun gear and the second sun gear are directly connected to each other, and the first planet carrier and the second planet carrier are directly connected to each other, so that the first shift portion comprises a first operational element formed as the first and second sun gears, a second operational element formed as the first ring gear, a third operational element formed as the first and second planet carriers, and a fourth operational element formed as the second ring gear.

10. The seven-speed powertrain of claim 8, wherein:

the first operational element and the second operational element are respectively connected to a transmission housing via respective brakes; and the second operational element is connected to the third operational element via a clutch.

11. The seven-speed powertrain of claim 8, wherein, in the second shift portion, the third and fourth sun gears are fixedly connected to each other, and the third ring gear and the fourth planet carrier are fixedly connected to each other, so that the second shift portion comprises a fifth operational element formed as the third and fourth sun gears, a sixth operational element formed as the third planet carrier, a seventh operational element formed as the third ring gear and the fourth planet carrier, and an eighth operational element formed as the fourth ring gear.

12. The seven-speed powertrain of claim 8, wherein:

the fifth operational element and the seventh operational element are respectively connected to a transmission housing via respective brakes; and the seventh operational element is variably connected to an input shaft via a clutch.

* * * * *